US006912223B1

(12) United States Patent
Sloane

(10) Patent No.: US 6,912,223 B1
(45) Date of Patent: Jun. 28, 2005

(54) AUTOMATIC ROUTER CONFIGURATION

(75) Inventor: Timon Sloane, Los Altos, CA (US)

(73) Assignee: Network Technologies Inc., Fremont, CA (US)

( * ) Notice: Subject to any disclaimer, the term of this patent is extended or adjusted under 35 U.S.C. 154(b) by 0 days.

(21) Appl. No.: 09/186,211

(22) Filed: Nov. 3, 1998

(51) Int. Cl.[7] .................................................. H04J 3/02
(52) U.S. Cl. ...................................... 370/401; 370/469
(58) Field of Search ......................... 370/392, 401–405, 370/469

(56) References Cited

U.S. PATENT DOCUMENTS

| | | | |
|---|---|---|---|
| 5,420,862 A | | 5/1995 | Perlman |
| 5,506,838 A | | 4/1996 | Flanagan |
| 5,914,938 A | * | 6/1999 | Brady et al. ................ 370/254 |
| 5,920,566 A | * | 7/1999 | Hendel et al. .............. 370/401 |
| 6,014,380 A | * | 1/2000 | Hendel et al. .............. 370/392 |
| 6,091,732 A | * | 7/2000 | Alexander, Jr. et al. .... 370/401 |
| 6,115,385 A | * | 9/2000 | Vig ............................. 370/401 |
| 6,172,981 B1 | * | 1/2001 | Cox et al. .................... 370/401 |

OTHER PUBLICATIONS

Press Release: "Flowwise Networks Unveils New Line of Plug and Play Auto–Configuring Router Accelerators," Sep. 28, 1998, San Jose, Ca.
Press Release: "Flowwise Networks Unveils Plug–in Accelerator for Cisco Routers," Oct. 21, 1998, San Jose, Ca.
Press Release: "New Router Accelerator Successfully Enters Field Testing," Jun. 15, 1998, San Jose, Ca.
Perlman, R. "Interconnections: Bridges and Routers," pp. 43–98, (Chapter3, Transparent Bridges), Addison–Wesley (Reading, Ma), 1992.

* cited by examiner

Primary Examiner—Min Jung
(74) Attorney, Agent, or Firm—Townsend and Townsend and Crew LLP

(57) ABSTRACT

Network router and multi-layer switch configuration is simplified, whereby packet flows are intercepted and identified while passing through, and fast routes are learned and cached on flow-by-flow basis. Simplified approach avoids configuration of network topology and provides plug-and-play installation, without configuring network or improved multi-layer switch.

12 Claims, 4 Drawing Sheets

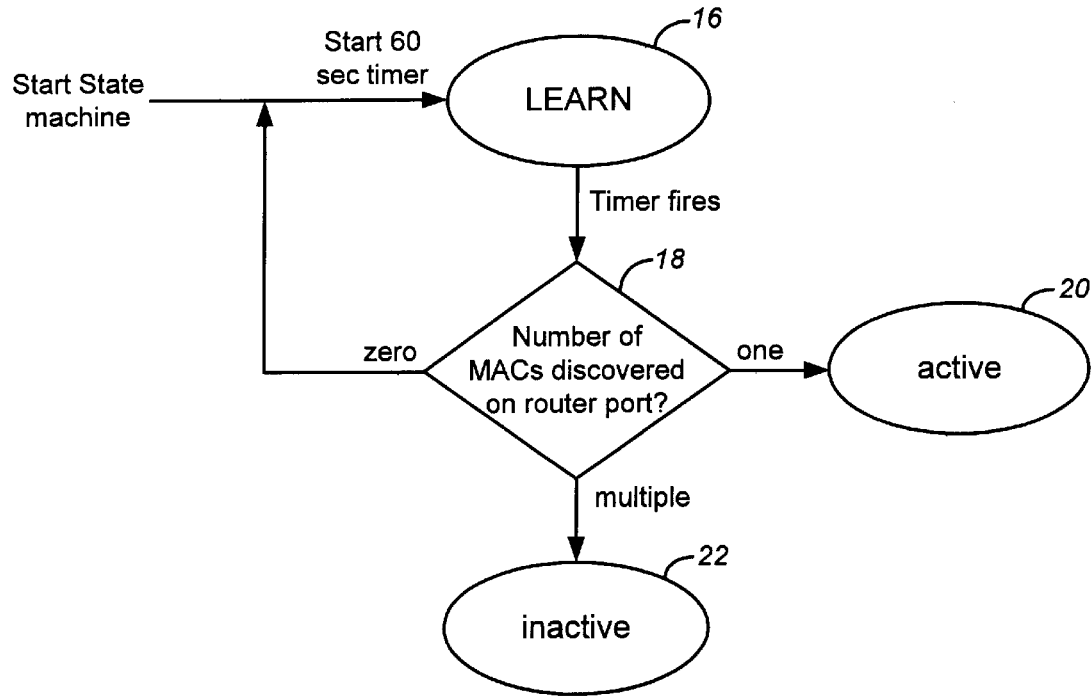

*FIG. 2A*

Interface State Descriptions

| State | Description |
|---|---|
| Learn | Attempting to learn the Ethernet MAC address of the router attached to the odd numbered Layer-2 port. |
| Inactive | More than one MAC address was detected attached to the odd numbered port.<br><br>This pair of ports falls back to Layer-2 only switch operation. This is the "failure" mode of operation. |
| Active | This router's MAC address has been learned and the multi-layer switch can begin to perform Layer-3 routing in place of the router. |

*FIG. 2B*

L2 CAM after Host-B detected

| Destination MAC Addr | Output Port |
|---|---|
| <SWITCH MAC #1 through #16> | L3 forwarding logic |
| <Router MAC addresses learned on router ports> | L3 forwarding logic |
| <HOST-B MAC address> | Multi-layer Switch Port B+1 |

*FIG. 4A*

L3 CAM after Host-B detected

| Destination IP Addr | Output Port | Dst MAC address for reformulating pkt hdr |
|---|---|---|
| Default | CPU | <not used> |
| <Host-B IP Address> | Port B+1 | <Host-B MAC Addr> |

*FIG. 4B*

L2 CAM after Host-A detected

| Destination MAC Addr | Output Port |
|---|---|
| <SWITCH MAC #1 through #16> | L3 forwarding logic |
| <Router MAC addresses learned on router ports> | L3 forwarding logic |
| <HOST-A MAC address> | Multi-layer Switch Port A+1 |

*FIG. 4C*

L3 CAM after Host-A detected

| Destination IP Addr | Output Port | Dst MAC address for reformulating pkt hdr |
|---|---|---|
| Default | CPU | <not used> |
| <Host-A IP Address> | Multi-layer Switch Port A+1 | <Host-A MAC Addr> |

*FIG. 4D*

AUTOMATIC ROUTER CONFIGURATION

FIELD OF INVENTION

Invention relates to digital networking apparatus and methodology, and more particularly to automatic router configuration approach for improving network switching performance and flexibility.

BACKGROUND OF INVENTION

In conventional network systems, substantial and complex effort is required typically to configure network topology for switching and routing equipment. More recently, so-called multi-layer switches provide interconnection at Layer 2 and Layer 3 protocol to improve network integration and performance. However, because such multi-layer switches effectively functioning as hardware-based routers, thereby employing conventional routing protocols such as RIP (Routing Information Protocol) or OSPF (Open Shortest Path First) to calculate paths through the network, network managers still must reconfigure ports and reassign subnetwork numbers. Accordingly, there is need for simplified network router configuration.

SUMMARY OF INVENTION

Invention resides in simplified and automated approach to network configuration using improved multi-layer switching apparatus and methodology. In particular, packet flows or signals are learned or "snooped" while passing through improved multi-layer switch, and representations of fast routes are loaded into forwarding table including Layer-2 and/or Layer-3 addressing information in digital storage, such as content-addressable memory (CAM), on flow-by-flow or route-by-route basis. Preferred approach improves performance by avoiding pre-determination of network topology. Improved multi-layer switch is preferably installed flexibly (i.e., plug-and-play), essentially without configuring network or improved multi-layer switch. Such multi-layer switch offloads significant portion of traffic load from routers, thereby freeing routers for other use.

BRIEF DESCRIPTION OF DRAWINGS

FIG. 2A is flow chart for implementing improved multi-layer switch according to present invention. FIG. 2B is descriptive table of operational states according to present invention. FIGS. 4A–D are descriptive tables of various storage data during operation according to present invention.

DETAILED DESCRIPTION OF PREFERRED EMBODIMENT(S)

Figure 1A:
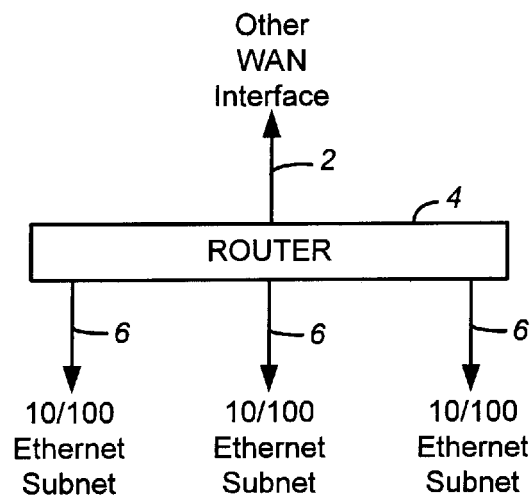
FIG. 1A is general system block diagram of conventional (PRIOR ART) network router for coupling wide-area and local-area subnets.

In FIG. 1A, block diagram of conventional (PRIOR ART) network router 4, such as commercial network routing equipment available from Cisco, couples wide-area network (WAN) interface 2 to one or more 10/100 Ethernet subnet local-area network (LAN) 6. Ordinarily, packets are routed by router 4 to and from various source and destination network nodes coupled thereto.

Figure 1B:
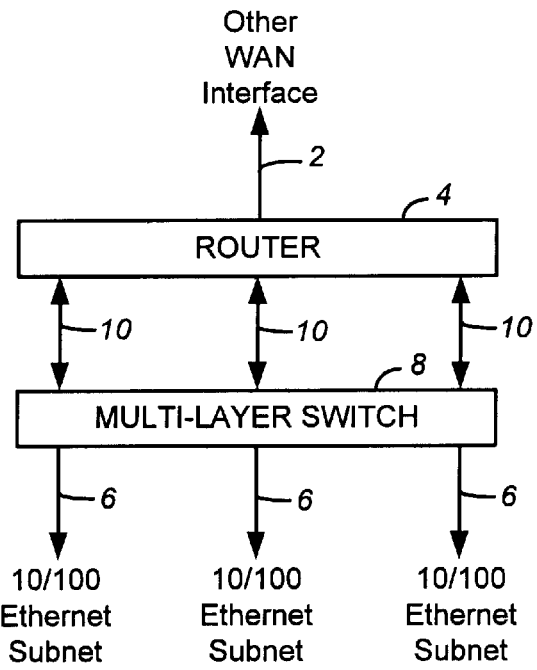
FIG. 1B is general system block diagram of network router and multi-layer switch for coupling wide-area and local-area subnets according to present invention.

In accordance with preferred embodiment of present invention claimed herein, conventional network router system is modified, as shown in FIG. 1B, to include improved multi-layer switching circuit and associated software functionality 8 coupled 10 thereto. As coupled, improved multi-layer switch 8 serves effectively to "front-end" conventional router 4, thereby offloading substantial portion of traffic handled by router 4, extending useful life expectancy of router 4, and improving overall network performance. In particular, simplified and automated network configuration is achieved whereby packet flows are identified while passing through improved multi-layer switch. Additionally, fast packet routes are loaded into storage, such as content-addressable memory(CAM), on flow-by-flow basis. Preferred approach improves performance by avoiding pre-determination of network topology. Also preferably, improved multi-layer switch is installed flexibly (i.e., "plug-and-play" functionality), essentially without configuring network or improved multi-layer switch. Improved multi-layer switch offloads significant portion of router traffic load, thereby freeing router for other use.

Preferably, Internet Protocol (IP) configuration, according to present invention, employs standard IP protocols, such as Address Resolution Protocol (ARP) and Internet Control Message Protocol (ICMP), thereby providing functional compatibility with standard IP networks. Moreover, by not requiring particular routing protocol, it is contemplated that present configuration approach may be implemented as well in networks using other network standard protocol, such as Routing Information Protocol (RIP), Open Shortest Path First (OSPF), and Interior Gateway Routing Protocol (IGRP, i.e., as specified commercially by Cisco).

To set-up initially, improved multi-layer switch, as defined herein, is interconnected between WAN interface 2/backbone router 4 and LAN Ethernet subnets 6. Preferably, improved multi-layer switch functionality 8 includes packet processing software code and/or hardware logic, including general or custom system or network processor or controller and associated code or instructions for enabling Layer-2 and Layer-3 switching therebetween, for example, as accomplished substantially using "IMPROVED MULTI-LAYER SWITCHING APPARATUS" specified in co-pending U.S. patent application Ser. No. 09/118,458, filed Jul. 17, 1998, which is hereby incorporated by reference.

Generally, when operating according to present network configuration technique, improved multi-layer switch 8 automatically determines or learns adaptively and dynamically topology of network coupled thereto (i.e., Layer-2 Media Access Control (MAC) and Layer-3 Internet Protocol (IP) addresses). To determine presence and location of router 4, particularly port addresses, for example, improved multi-layer switch 8 emits request signals, interprets corresponding reply signals, as well as observes routing protocol updates arriving periodically from router 4. Moreover, to determine presence and location of subnetworks in LAN segments 6 attached thereto, improved multi-layer switch 8 monitors and identifies IP source addresses of incoming ARP request and response messages, wherefrom improved multi-layer switch 8 may learn logical connections, or virtual LANs effectively, between each router port and any LAN segments in same subnetwork.

In particular, by actively generating and monitoring (i.e., effectively snooping) on ARP signals associated with received packets, improved multi-layer switch 8 automatically determines and learns current locations of network endstations, nodes, or ports coupled thereto. Importantly, such result is achieved because network IP devices ordinarily broadcast ARP signals to query and learn MAC addresses of other IP devices. Preferably, improved multi-layer switch 8 imposes certain delay period prior to broadcasting signals to segments within appropriate subnetwork 6, then copies or otherwise provides Layer-2 MAC and Layer-3 IP addresses of sources, along with incoming port numbers, into forwarding table provided in digital storage, such as Content-Addressable Memory (CAM) or other equivalent memory. CAM may be configured for storing separate forwarding tables for Layer-2 and Layer-3 addresses. Moreover, aging-out unused entries in Layer-2 and Layer-3 tables may ensure that forwarding table is current with subsequent changes to network.

Upon receiving unicast packet from local endstation, improved multi-layer switch 8 initially determines whether packet is being transmitted between subnetworks; if not, packet is switched properly to output port according to packet destination MAC address, in compliance with Layer-2 switching protocol. Non-IP packets and packets coming from router 4 are switched at Layer 2. Further, in case when packet travels between subnetworks 6, improved multi-layer switch 8 looks-up or searches for destination IP address in forwarding table; if no match is found, switch 8 sends packet to router 4. Packet may be bound for wide area or local device which has not yet been learned by improved multilayer switch, in either case, router 4 may forward packet conventionally. When improved multi-layer switch 8 finds match in forwarding table for destination address, switch 8 may perform address substitutions, calculate new IP checksum, manipulation of specified fields (e.g., time-to-live field (TTL)), and send subject packet properly to LAN segment, effectively faster than if performed by router alone. Moreover, in accordance with one aspect of present invention, improved multi-layer switch 8 uses MAC address of appropriate port on backbone router as packet's source address, instead of identifying itself as packet source. In this way, improved multi-layer switch 8 appears transparent to source and destination devices.

Preferably, present methodology for automatic IP configuration improves network performance by optimizing or maximizing router bypass. Hence, after forwarding table is provided and updated, significant amount of local traffic may be routed or bridged by improved multi-layer switch 8, thereby relieving router 4 of local IP forwarding burden and enabling router 4 to concentrate more on moving wide-area and non-IP traffic. Preferably, network manager need not configure improved multi-layer switch 8 or router 4. Advantageously, improved multi-layer switch 8 approach enables network users and managers practical path to transition from traditional software-based routing to next-generation hardware-based multilayer switching. Furthermore, by using industry networking standards, improved multi-layer switch 8 may be deployed in cooperation with installed networks. Because improved multi-layer switch 8 supports full conventional routing, network manager can begin with automatic configuration scheme according to present invention to achieve relatively fast and easy performance improvement, and as necessary, for example, when system or network application requirements require, activate full routing for more flexible, robust path determination of network configuration.

During traffic processing, one or more packets are received from router 4 and destined for certain subnet(s). In accordance with present methodology, packet enables improved multi-layer switch 8 effectively to learn that certain host exists on subnet, such that such knowledge is learned and stored in network Layer-2 and/or Layer-3 configuration database or forwarding table in cache device, such as CAM storage. Once such information is stored in CAM, for example, improved multi-layer switch 8 may forward subsequently-received packets destined for same host from other network node or address. In particular, packet traffic received from certain subnet and destined to router 4, according to present methodology, will effectively "hit" or be recognized and directed accordingly by CAM storing or seeded, for example, with Layer-2 MAC address of router 4. This recognition, interception and directed switching scheme allows dynamic interception and control of router bound traffic. Moreover, when Layer-3 IP address entry is provided in CAM storage, then subject packet may be forwarded to specified subnet interfaces according to corresponding forwarding table address; or, optionally, such packet may be attended to by system or network processor CPU for forwarding to subnet 6 or to router 4.

Figure 1C:
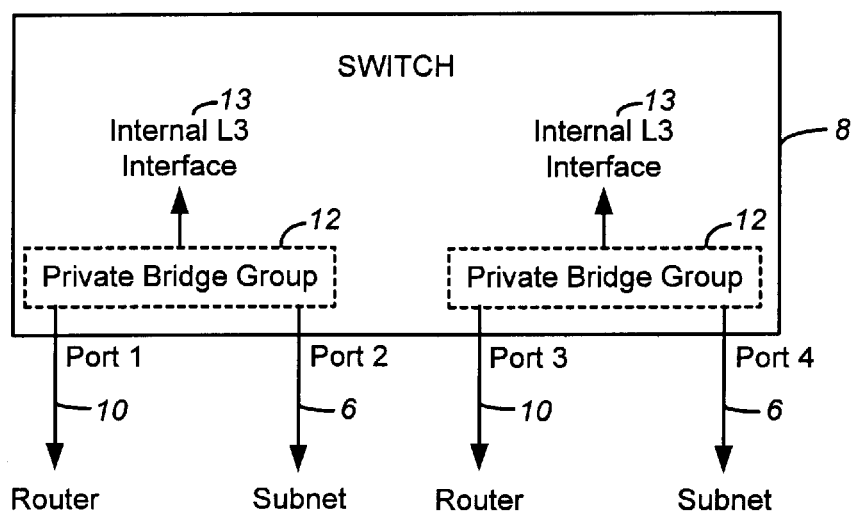
FIG. 1C is block diagram of improved multi-layer switch for implementing present invention.

Preferably, interconnect wiring of improved multi-layer switch 8 and router 4 are physically arranged such that router 4 ports are front-ended conveniently for electrical connectability to odd number port on improved multi-layer switch 8. For example, as shown in FIG. 1C, improved multi-layer switch 8 includes one or more private bridge groups 12 which provide internal Layer 3 interface 13 coupling to neighboring ports 10, 6 for corresponding router and subnet connections. In particular, such port wiring assignments are provided preferably such that corresponding connection to IP subnet may be plugged in physical port having even number, for example, on improved multi-layer switch 8 (Port N+1), relative to corresponding router port assigned to adjacent physical port having odd, consecutively neighboring, port number on switch 8 (Port N).

In preferred implementation, each internal Layer-3 interface 13 may operate independently from other internal Layer-3 interface 13. As shown in operational diagram of FIG. 2A, significant functional states of internal Layer-3 interface include learn, active, and inactive states, as described in table of FIG. 2B.

Preferably, at boot time or set-up, improved multi-layer switch 8 causes system processor or equivalent hardware and/or software controller initially to store in forwarding table of cache memory or CAM storage two corresponding physical ports associated with one or more internal Layer-3 interface 13 in private bridge group 12. Thus, when improved multi-layer switch is booted, traffic between router ports and corresponding subnet port are initialized with pre-specified forwarding configuration information, thereby enabling network to continue operation, such as according to certain prior or desired state. In this modular manner, improved multi-layer switch 8 may be installed on "live" and active networks relatively quickly, without effectively interrupting routing or switching traffic flow or system or network application programs.

In preferred implementation, at boot time, internal Layer-3 interface 13 configures improved multi-layer switch 8 MAC address of odd numbered port into macaddr registers, thereby configuring pair of odd/even ports in private bridge group 12. Also, router 4 odd port is set to forward "unknown" unicast packets to both the subnet port and to network or system processor, and CAM forwarding table for Layer-2 addressing is configured with MAC addresses of such two physical ports (i.e., odd numbered port into macaddr registers) for forwarding packets to network or system processor. Preferably, CAM may not be configured for automatic learning of source MAC addresses on router-and subnet ports, and CAM forwarding table for Layer-3 addressing may be configured with default route to send packets to internal network or system processor port.

Referring to FIG. 2A, Learn state 16 serves to enable improved multi-layer switch 8 to learn, or attempt to learn, Ethernet MAC address of router 4 attached to odd-numbered Layer-2 port. In this dynamically adaptive or intelligent manner, improved multi-layer switch 8 allows packet traffic to flow unmodified between corresponding pair of ports while switch 8 effectively learns or determines current network topology. Preferably, present methodology for achieving automated network configuration assumes active acquisition or detection from subject packet of router 4 Ethernet MAC address connected to odd numbered port on improved multi-layer switch 8. In particular, Ethernet address enables improved multi-layer switch 8 to configure Layer-2 switch processing logic or code for real-time interception of packets from certain subnet and destined to router 4. When in Learn state 16, CAM entries are provided in forwarding table during IP packet processing. For example, as to packets received on odd-number router port (port P), Layer-2 CAM entry may be established with <destination MAC>, <port P+1>, Layer-3 CAM entry may be established with <destination IP>, <destination MAC>, <port P+1>, system or network processor may store source MAC address, thereby maintaining address list detected on given router port, and such processor may discard subject packet currently being processed. By configuring router/subnet port pair in private bridge group 12, Layer-2 switching logic and/or code may forward unaltered subject packet to corresponding subnet port P+1. Further, by adding Layer-2 CAM entry in forwarding table, subsequent packets on same flow are no longer tracked as destined for "unknown" address, and are processed by switching logic and/or code, thereby reducing load on system or network processor. Moreover, for packets received on even-number subnet port (port P+1), by configuring router/subnet port pair in private bridge group 12, Layer-2 switch logic and/or code forwards unaltered subject packet out corresponding router port P. Preferably, improved multi-layer switch 8 may not be configured to forward packets received on subnet port to system or network processor, whereby improving network performance by avoiding packet processing by such processor. During Learn phase 12, Layer-3 CAM may be provided IP routing information. Without Layer-2 CAM entry intercepting packets from subnet and destined for router, Layer-3 CAM entries are unused; when improved multi-layer switch 8 enters "Active" state 20, such entries are effective.

Preferably, processing of forwarding table or cache for Layer-2 and/or Layer-3 CAM entries are aged or time-delayed according to present methodology, whereupon during extended period, improved multi-layer switch 8 may exclusively process non-IP traffic from particular MAC address. In this aging scheme, Layer-3 CAM entry may be aged, for example, while Layer-2 CAM entry is refreshed continuously. When Layer-2 entry is active, processor may not obtain subject packet or copy thereof, thereby not re-entering Layer-3 CAM entry. Thus, CAM entries (Layers 2 and 3) may be aged and deleted together. Hence, preferably only Layer-3 aging is performed; once Layer-3 entry is flagged for deletion, corresponding Layer-2 entry is deleted.

Improved multi-layer switch 8 may convert Layer-3 interface from Learn state 16 into Active 20 or Inactive 22 state upon transition conditions, i.e., router port sampled for new Ethernet addresses for specified delay (e.g., at least 60 seconds); and one or more Source MAC address has been determined 18 on router 4 interface. When improved multi-layer switch 8 determines that internal Layer-3 interface 13 is not connected to single router according to present methodology, such interface 13 enters Inactive state 22, wherein switch 8 continue forwarding traffic between router 4 and subnet ports 6, without attempting Layer-3 routing. Preferably, Layer-2 switching logic and code remains configured with such ports in separate bridge group 12, without attempting Layer-3 operations. Layer-2 source MAC learning effectively offloads system or network processor. Output device, e.g., emitting diode pattern on front panel, may indicate when port pair enters certain state(s). For example, Inactive mode 20 indication facilitates failure condition for equipment repair or removal.

Internal Layer-3 interface 13 may enter Active state 20 independently of other interfaces 13, for example, when MAC address of router 4 attached to odd-number port is known; or upon determination of single router MAC address attached to router port. When entering Active state 20, Layer-2 CAM is updated with MAC address of router 4 discovered in Learn 16 state of operation, thereby causing traffic originating from subnet port and destined for router 4 to be intercepted and processed by Layer-3 switch logic and code, as described herein. During Active state 20, improved multi-layer switch 8 may attempt to route identified IP flows between different subnet ports, and non-IP traffic are forwarded at Layer-2. IP flows between subnet port and router port may be processed continuously by system or network processor. Preferably, packet processing rules for Active state 20 are substantially same or functionally equivalent to packet processing rules for Learn state 16. Additionally, cache aging process during Active state 20 may be substantially same or functionally equivalent to cache aging process for Learn state 16. Furthermore, switch 8 interface allows user to enable Layer-3 configuration according to present invention, for example, when Layer-3 interface is mapped to only two Layer-2 ports; such Layer-2 ports are physically adjacent (i.e., port numbers 1&2, 5&6, etc.); and lowest numbered Layer-2 port associated with Layer-3 interface is odd-number (i.e., port numbers 1, 3, 5, etc.).

Figure 3A:
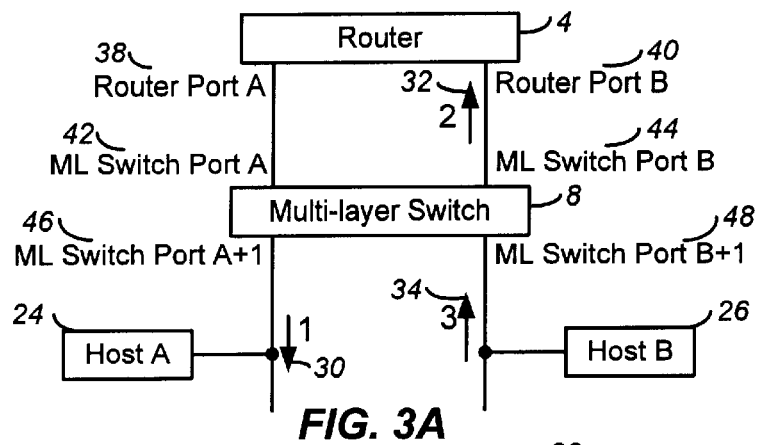
FIGS. 3A–C are block diagrams of various operational implementations of preferred embodiment of present invention.

When operating according to present inventive methodology, IP packets may be communicated between network hosts on different subnets. In FIG. 3A, IP packet is sent between two subnets, whereby Host-A 24 sends packet to Host-B 26. In such representative case, packet-1 30 is structured as follows:

| | |
|---|---|
| Source MAC: | Host-A MAC |
| Source IP: | Host-A IP |
| Destination MAC: | Router-Port-A MAC |
| Destination IP: | Host-B IP |

When packet-1 30 is received at Port A+1 46, improved multi-layer switch 8 processes received packet such that destination MAC address of packet effectively "hits" corresponding entry in forwarding table of Layer-2 CAM, since router port-A MAC address was previously provided in Layer-2 CAM, and switch 8 may thereby intercept packets accordingly destined for router 4. When packet represents new packet flow having different addressing scheme, there will not be existing Layer-3 entry in CAM forwarding table, and subject packet may be passed-on to system or network processor for forwarding to network destination location, instead of being handled by hardware in improved multi-layer switch 8. Such processor may forward subject packet out switch port A 42 to router 4 through router port A 38, without further processing. Furthermore, router 4 may process subject packet and send packet-2 32 through router port B 40 to switch port B 44 with following structure:

| | |
|---|---|
| Source MAC: | Router-Port-B MAC |
| Source IP: | Host-A IP |
| Destination MAC: | Host-B MAC |
| Destination IP: | Host-B IP |

Packet-2 may be forwarded to system or network processor when no Layer-2 CAM entry exists in forwarding table corresponding to destination MAC, and unknown MAC addresses are designated for forwarding to such processor. Simultaneously, subject packet is forwarded by improved multi-layer switch 8 to switch port B+1 as packet-3 34. Preferably upon receiving packet-2 32, improved multi-layer switch 8 inserts Layer-2 and Layer-3 CAM entries in forwarding table corresponding to subject packet, according to following rules: Layer-2 CAM entry is created with <Destination MAC>, <port P+1>; and Layer-3 CAM entry is created with <IP>, <Destination MAC>, <port P+1>. Accordingly, after Host-B address information is detected from subject packet analysis, Layer-2 and Layer-3 CAM entries in forwarding tables, such as Destination MAC Address, Output Port, Destination IP Address, Output Port, and Destination MAC address for reformulating packet header (pkt hdr), are updated as shown respectively in FIGS. 4A–B, wherein bold text represents updates, and normal text represents existing entries. After such updates are performed, IP packets from Host-A 24 to Host-B 26 may be routed by improved multi-layer switch 8, and Ethernet packets from router 4 destined to Host-B 26 may be forwarded by improved multi-layer switch 8. Preferably, when improved multi-layer switch routes packet on behalf of router 4, as described herein, Source MAC address of packet is that of router 40 port rather than Source MAC address of switch port 48 previously forwarding such packet(s). When Host-B 26 replies to Host-A 24, improved multi-layer switch 8 processes packets in same or functionally equivalent manner as packets from Host-A 24 to Host-B 24. After first packet is processed, Layer-2 and Layer-3 CAM entries are configured to forward traffic using improved multi-layer switch 8, thereby effectively bypassing processing by router 4.

Figure 3B:
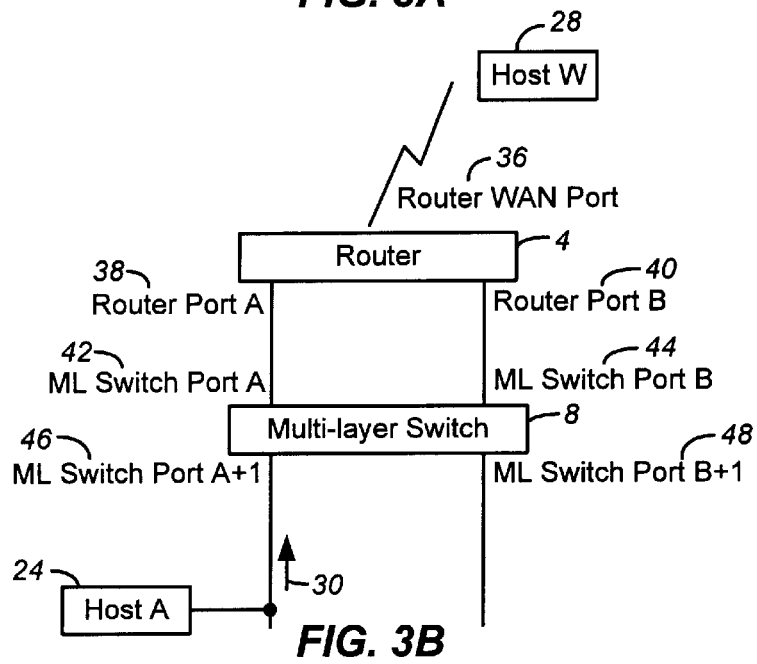
Figure 3C:
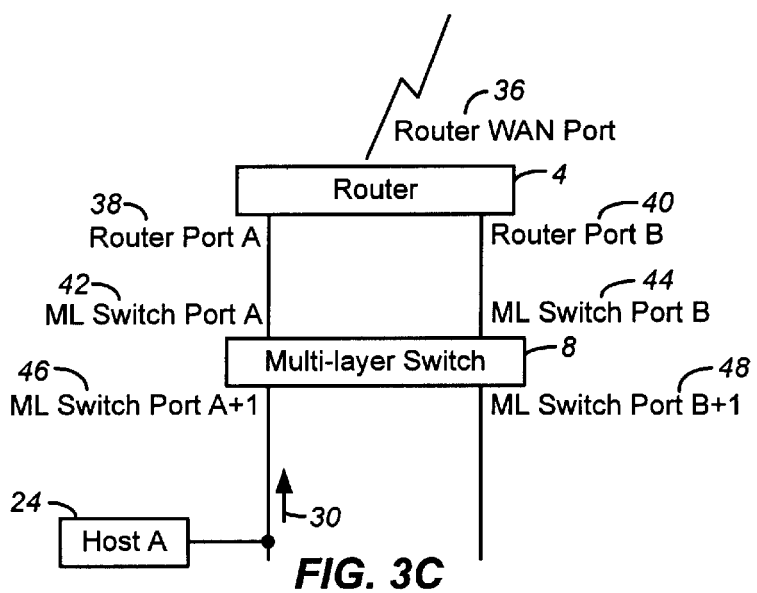

In another operating mode according to present inventive methodology, IP packets may be sent by Host-A 24 and destined for Host-W 28 accessible via router 4 WAN interface 36, as shown in FIGS. 3B–C. In such representative case, packet-1 30 is structured as follows:

| | |
|---|---|
| Source MAC: | Host-A MAC |
| Source IP: | Host-A IP |
| Destination MAC: | Router-Port-A MAC |
| Destination IP: | Host-W IP |

When improved multi-layer switch 8 receives packet-1 30, destination MAC address hits Layer-2 CAM, because router port-A MAC address is in Layer-2 CAM, and switch 8 may intercept packets destined for router 4. Being a new flow, Layer-3 entry does not exist in CAM forwarding table, and packet is passed to system or network processor for forwarding. Such processor forwards subject packet through switch port-A 42, without further processing, and router 4 processes packet and sends packet through WAN port 36. When response packet is received from Host-W, packet is sent from router port-A 38 to switch port A 42 with following structure:

| | |
|---|---|
| Source MAC: | Router-Port-A MAC |
| Source IP: | Host-W IP |
| Destination MAC: | Host-A MAC |
| Destination IP: | Host-A IP |

Packet is then forwarded to system or network processor due to no existing Layer-2 CAM entry in forwarding table for destination MAC, and unknown MAC addresses are configured for forwarded to such processor. Subject packet is forwarded the packet to switch port A+1 46. When system or network processor receives packet, Layer-2 and Layer-3 CAM entries are provided in forwarding table, according to following rules: Layer-2 CAM entry is created with <Destination MAC>, <port P+1>; and Layer-3 CAM entry is created with <Destination IP>, <Destination MAC>, <port P+1>. Accordingly, after Host-A 24 address information is detected, Layer-2 and Layer-3 CAM entries are updated as shown in FIGS. 4C–D, wherein bold text represents updates, and normal text represents existing entries. After such updates, IP packets from router 4 to Host-A 24 are Layer-2 switched by improved multi-layer switch 8, while system or network processor may continue to be called upon to forward packets from Host-A 24 to Host-W 28.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks. Other variations and embodiments are possible in light of above teachings, such as providing customizable Quality-of-Service (QOS) configuration in router, spanning-tree and bridging configuration from router for Layer-2 switching between subnets, and packet filtering configuration from router for filtering traffic forwarded on behalf of router, and simultaneous interception and processing of packets destined for multiple routers; and it is thus intended that the scope of invention not be limited by this Detailed Description, but rather by Claims following.

What is claimed is:

1. A system for facilitating routing of packets, comprising:
   a router configured to receive and forward packets, the router having a plurality of router ports;
   a plurality of subnets including a first source subnet, each of the plurality of subnets configured to receive and send packets; and
   a multi-layer switch positioned between the router and the plurality of subnets and configured to communicate directly with the router and the plurality of subnets, the multi-layer switch having a plurality of ports, each port coupling to either a router port or a subnet, a pair of adjacent ports coupling a router port to a subnet, the multi-layer switch further configured to examine respective packets received from the router and the plurality of subnets, the multi-layer switch further having a forwarding table having a plurality of entries, each entry having a Layer-2 sub-entry a Layer-3 sub-entry, the Layer-2 sub-entry having a destination Media Access Control (MAC) address and destination port information, the Layer-3 sub-entry having a destination Internet Protocol (IP) address, the destination port information and the destination MAC address;
   wherein a first packet sent by the file source subnet is examined by the multi-layer switch;

wherein the forwarding table is used by the multi-layer switch to determine how to route the first packet sent by the first source subnet;

wherein if the first packet is intended for a first destination subnet that is one of the plurality of subnets, the first packet is delivered by the multi-layer switch directly to the first destination subnet without passing through the router, and if the first packet is not intended for any of the plurality of subnets, the first packet is delivered by the multi-layer switch to the router for further routing; and wherein the forwarding table is dynamically updated with information relating to the packets received from the router and the plurality of subnets.

2. The system of claim 1 wherein the multi-layer switch checks destination Layer-2 information and destination Layer-3 information of the first packet against the plurality of entries in the forwarding table;

wherein if the destination Layer-2 and Layer-3 information of the first packet is found in the forwarding table, the first packet is delivered to the first destination subnet directly by the multi-layer switch; and wherein if either the destination Layer-2 information or the destination Layer-3 information or both are not found in the forwarding table, the first packet is delivered by the multi-layer switch to the router for further routing.

3. The system of claim 1 wherein a second packet intended for a second destination subnet is sent by the router to the multi-layer switch, the second destination subnet being one of the plurality of subnets; and wherein if destination Layer-2 information of the second packet is not found in the forwarding table, a new entry incorporating the destination Layer-2 information and destination Layer-3 information of the second packet is created and inserted into the forwarding table, the new entry further including port information relating to a port through which the multi-layer switch is coupled to the second destination subnet.

4. The system of claim 3 wherein the destination Layer-2 information of the second packet corresponds to destination Layer-2 information of the router.

5. A switch for facilitating routing of packets between a router having a plurality of router pots and a plurality of subnets, the switch being positioned between the router and the plurality of subnets, comprising:

a plurality of ports, each port coupling to either a router port or a subnet, a pair of adjacent ports coupling a router port to a subnet;

logic configured to communicate directly with the router and the plurality of subnets;

logic configured to receive respective packets from the router and the plurality of subnets;

logic configured to examine a first packet sent by a first source subnet and intended for a first destination subnet, the first source subnet being one of the plurality of subnets;

logic configured to route the first packet directly to the first des on subnet if the first destination subnet is one of the plurality of subnets without passing the packet to the router;

logic configured to route the first packet to the router for further routing to the first destination subnet if the first destination subnet is not one of the plurality of subnets;

a forwarding table having a plurality of entries, each entry having a Layer-2 sub-entry and a Layer-3 sub-entry; the Layer-2 sub-entry having a destination Media Access Control (MAC) address and destination port information, the Layer-3 sub-entry having a destination Internet Protocol (IP) address the destination port information and the destination MAC address;

logic configured to utilize the forwarding table to determine how to route the first packet; and logic configured to dynamically update the forwarding table with information relating to the packets received from the router and the plurality of subnets.

6. The switch of claim 5 wherein destination Layer-2 information and destination Layer-3 information of the first packet is checked against the plurality of entries in the forwarding table;

wherein if the destination Layer-2 and Layer-3 information of the first packet is found in the forwarding table, first packet is delivered to the first destination subnet directly without going through the router; and wherein if either the destination Layer-2 information or the destination Layer-3 information or both are not found in the forwarding table, the first packet is delivered to the router for further routing to the first destination subnet.

7. The switch of claim 5 wherein a second packet intended for a second destination subnet is received from the router, the second destination subnet being one of the plurality of subnets;

wherein if destination Layer-2 information of the second packet is not found in the forwarding table, a new entry incorporating the destination Layer-2 information and destination Layer-3 information of the second packet is created and inserted into the forwarding table, the new entry further including port information relating to a port through which the switch is coupled to the second destination subnet.

8. The switch of claim 7 wherein the destination Layer-2 information of the second packet corresponds to destination Layer-2 information of the router.

9. A method for facilitating routing of packets between a router having a plurality of router ports and a plurality of subnets, comprising:

positioning a multi-layer switch having a plurality of ports between the router and the plurality of subnets, each port coupling to either a router port or a subnet, a pair of adjacent ports coupling a router port to a subnet, the multi-layer configured to communicate directly with the router and the plurality of subnets;

directing the multi-layer switch to receive and examine a first packet from a first source subnet, the first source subnet being one of the plurality of subnets;

maintaining a forwarding table in the multi-layer switch, the forwarding table having a plurality of entries, each entry having a Layer-2 sub-entry and a Layer-3 sub-entry, the Layer-2 sub-entry having a destination Media Access Control (MAC) address and destination port information, the Layer-3 sub-entry having a destination Internet Protocol (IP) address, the destination port information and the destination MAC address;

using the forwarding table to determine how to route the first packet that is sent by the first source subnet;

if the first packet is intended for a first destination subnet that is one of the plurality of subnets, directing the multi-layer switch to deliver the first packet directly to the first destination subnet without passing the first packet through the router;

if the first packet is not intended for any of the plurality of subnets, directing the multi-layer switch to deliver the first packet to the router for further routing; and updating the forwarding table dynamically with information relating to the first packet.

10. The method of claim 9 further comprising:

directing the multi-layer switch to check destination Layer-2 information and destination Layer-3 information of the first packet against the plurality of entries in the forwarding table;

directing the multi-layer switch to deliver the first packet to the first destination subnet directly if the destination Layer-2 information and destination Layer-2 information; and directing the multi-layer switch to deliver the first packet to the router if the destination Layer-2 information or the destination Layer-3 information or both are found in the forwarding table.

11. The method of claim 9 comprising:

directing the multi-layer switch to receive and examine a second packet from the router, the second packet intended for a second destination subnet; and if destination Layer-2 information of the second packet is not found in the forwarding table, creating a new entry in the forwarding table incorporating the destination Layer-2 information and destination Layer-3 information of the second packet and port information relating to a port through which the multi-layer switch is coupled to the second destination subnets.

12. The method of claim 11 wherein the destination Layer-2 information of the second packet corresponds to destination Layer-2 information of the router.

* * * * *